United States Patent [19]
Robart et al.

[11] Patent Number: 5,809,939
[45] Date of Patent: Sep. 22, 1998

[54] POSITIVE REINFORCEMENT BIT ASSEMBLY

[76] Inventors: Glenice Robart; Dave Robart, both of 2890 County Rd. 166, Elizabeth, Colo. 80107

[21] Appl. No.: 767,196

[22] Filed: Dec. 16, 1996

[51] Int. Cl.$^6$ ................................................. A01K 15/00
[52] U.S. Cl. .............................. 119/712; 119/905; 54/8; 54/71
[58] Field of Search .............................. 119/712, 71, 833, 119/905; 54/7, 8

[56] References Cited

U.S. PATENT DOCUMENTS

| | | |
|---|---|---|
| 617,583 | 1/1899 | Lemons . |
| 1,091,683 | 3/1914 | Mateer . |
| 2,604,069 | 7/1952 | Hobby ...................................... 119/833 |
| 3,837,142 | 9/1974 | Hill . |
| 4,040,422 | 8/1977 | Kuhn ....................................... 128/223 |
| 4,063,404 | 12/1977 | Taylor . |
| 4,280,316 | 7/1981 | Taylor . |
| 5,062,255 | 11/1991 | Myler et al. . |
| 5,557,905 | 9/1996 | Harding ............................... 119/833 X |
| 5,566,645 | 10/1996 | Cole .......................................... 54/8 X |

OTHER PUBLICATIONS

Dougherty and Lewis (1993) J.Exp.Anal.Behav. 59:521.
Sappington and Goldman (1994) J.An.Sci. 72:3080.
Conboy (1992) Vet.Clin.No.Am.Equine Pract. 8:101.
McCall (1990) J.Anim.Sci. 68:75.

Primary Examiner—Thomas Price
Attorney, Agent, or Firm—Julie L. Bernard

[57] ABSTRACT

A positive reinforcement bridle bit is described that is useful for training an animal, for example, a horse. Dispensing, at will, a pleasant tasting fluid therefrom, permits the immediate reward of the animal for performing a desired behavior or calming a fear. The invention may be used, for example, for the training of an unbroken colt or green-broke animal, for correction and retraining of problem horses and for further training of previously trained horses.

11 Claims, 2 Drawing Sheets

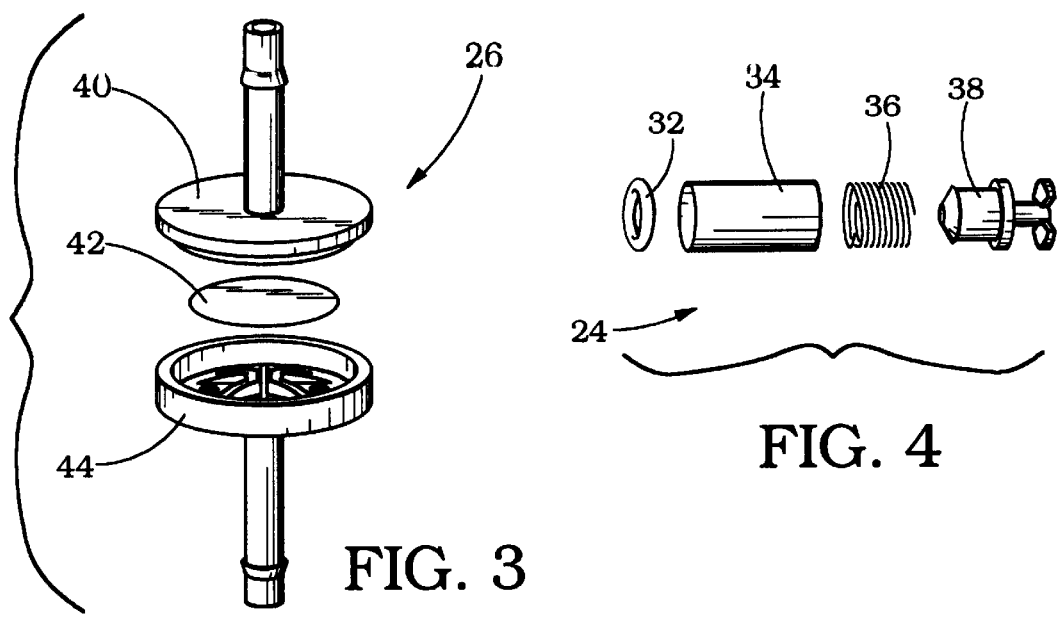
FIG. 3
FIG. 4
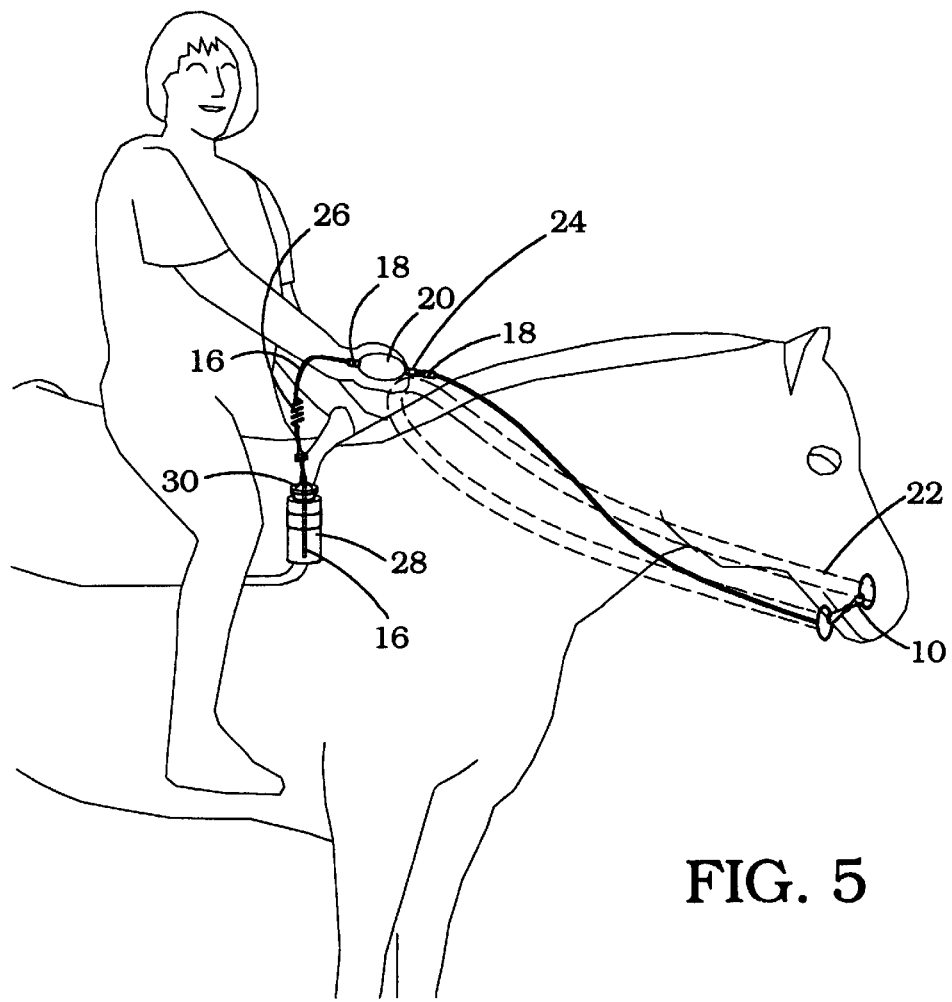
FIG. 5

POSITIVE REINFORCEMENT BIT ASSEMBLY

FIELD OF INVENTION

This invention relates to the general fields of animal training and devices therefor. Specifically, the instant application is directed to a novel positive reinforcement bit assembly that employs a bridle bit and pleasant tasting fluid, the administration of which is directly controlled by the animal trainer. The present invention, thus, relates to the art of controlling and training bittable animals, for example, horses, through the use of mouth bits, bit assemblies and devices related thereto. Additionally, the present invention provides a means for dispensing a pleasant tasting fluid to a horse, thereby allowing the immediate reward for a desired and/or appropriate behavior and facilitating behavior modification.

BACKGROUND AND PRIOR ART

Bridle bits and bitting systems have been used all over the world for centuries as a means of communication between the horse and its rider. They are used to communicate to the horse what the rider wishes the horse to do. In fact, horse training is, in large, communication. Without communication between the trainer and trainee, very little, if any, training takes place. Most present day horse training is pressure avoidance, and sometimes pain avoidance, training. That is, training via the use of tactile stimuli. Such training is, for example, where pressure is applied and when the horse gives to the pressure, the pressure is released. Thus, use of tactile stimuli has practical application to the control of horse behavior, because horses are controlled by riders through the delivery of tactile stimuli, often called aids by riders. These stimuli are most often given in one of three ways to the horse: to the horses's mouth with the bit, to the sides of the horse with the rider's legs, or to the horses back with the rider's posture or position in the saddle. Thus, there is widespread use of tactile stimuli to control behavior of horses, as it is an effective stimulus for horses. Dougherty and Lewis (1993) J. Exp. Anal. Behav. 59:521.

Commonly used pressure avoidance training may be effected by a leg, a shifting of the rider's weight or the reins and bit. Pain avoidance training is similar, in fact, many currently commercially available bits use this technique— give to the bit and pain is avoided. Some avoidance training is further reinforced using spurs, crops or whips. This type of training works, but it limits the communication between the horse and trainer by causing stress to both parties. Stress lowers the learning ability of all human and non-human animals. Specifically, when a horse is scared of making a mistake it is avoiding correction. That is, avoiding pain. This takes energy and keeps the horse in a defensive mode or posture. Horses are flight-oriented animals and are strong, all attempts at training are ineffective if the horse is not calm enough to receive the training stimuli. That is, listen to what is being communicated.

Bridle bits are generally used by the rider as a means of control or correction. Therefore, a horse is corrected for undesirable behavior but receives nothing for correct behavior. This methodology limits the trainer to pressure and pain avoidance training. That is, using punishment and correction for what is generally called aversive stimulation training. With the use of only corrections for undesirable behavior, the horse is caused higher levels of stress and prevented from reaching its full potential of learning ability. Horses' bits, a primary source of aversive stimulation, are carefully designed to allow the delivery of a punishing stimulus to the horse in a sensitive area with little effort by the rider. This is accomplished by a system of leather straps that hold the bit in the horse's mouth—collectively, collectively, called the bridle. By putting pressure on the reins attached to the bit, the rider brings the bit to bear on the horse's jaw bones. At rest, the bit sits on the horse's jaw bone, fitting comfortably into natural spaces between the horse's teeth. These very sensitive bones are easily stimulated by putting tension on the reins attached to the bit. Thus, the horse's behavior is readily reinforced by escape and avoidance of this punishing, or aversive, stimuli.

An understanding of the conditioning processes involved in training horses is lost because of two confusing factors. One is that the reins, through their attachment to the bit, are used to deliver both non-aversive and aversive stimuli. The other factor, horses' behavior problems can arise from a training regimen that fails to employ appropriate conditioning techniques or employs techniques that give the horse mixed messages. On the other hand, positive reinforcement training assists a horse in being motivated and enthusiastic in learning. This approach, in turn, lowers stress and decreases errors. Using only corrections causes higher stress in the horse and prevents the use of the horse's full learning and performance potential.

Training via positive reinforcement to modify behavior in humans and animals is derived from the branch of psychology credited to B. F. Skinner, known generally as behavior modification. For a general discussion of such principals as applied to animals, see, Pryor (1984) *Don't Shoot the Dog!: How to Improve Yourself and Others Through Behavioral Training*, Simon and Schuster (New York). Behavior modification draws a clear distinction between rewards and positive reinforcement, and negative reinforcement and punishment. That is, acceptable behavior is positively reinforced while unacceptable behavior receives negative reinforcement, or no attention at all. The application of behavior modification in horse training utilizes the horses natural talents and inclinations without hindering their learning ability through fright.

Horses that have the greatest ability to form and understand concepts are likely to be the horses best equipped to succeed in the training environment. Complex pattern discrimination learning and concept formation abilities in horses has been demonstrated by employing food reinforcement. Sappington and Goldman (1994) J. An. Sci. 72:3080. Such studies bolster what good horse trainers have always known—horses have the aptitude for learning to apply prior experience to subsequent training tasks. These data suggest that horses may have the ability to form concepts, and thus solve new problems based on characteristics they have in common with previously solved problems. Thus, when horses apply this ability in training, knowledge gained from the mastery of basic maneuvers facilitates the learning of more complex tasks. To date, positive reinforcement training has been used in only limited circumstances with horses. See, for example, Kurland (1991) A. Hum. Innov. Altern. 8:620 (enhance learning skills); Conboy (1992) Vet. Clin. No. Am. Equine Pract. 8:101 (artificial breeding training); and McCall (1990) J. Anim. Sci. 68:75 (equine learning behavior review).

No satisfactory solution to the problem of limiting a horses learning ability through pressure and pain avoidance training has been provided thus far. Presently, to employ positive reinforcement behavior modification training, the rider must get off the horse and give a treat to the horse, for example, a hand full of grain. This creates too much of a time delay for the horse to associate the reward with a specific behavior. This invention provides instant positive reinforcement. That is, the invention allows the trainer to say "yes" and "good job" by allowing the trainer to instantly reward the horse for the performance of the desired and requested behavior through the release of a desirable tasting fluid into the horse's mouth via the bit assembly.

Current bridle bit technology has enabled numerous variations on a theme to be commercially marketed. That is, various bit configurations that are all based on pain avoidance and negative reinforcement. The prior art discloses several different types of horse bit assemblies. U.S. Pat. Nos. 4,280,316 and 4,063,404, both to Taylor, describe bridle bits with means for holding a sugar cube useful as an inducement in training a horse to readily accept the bit into his mouth. Said bit is then employed in traditional pain avoidance training. It does not describe a bit that delivers a number of "on-command" training rewards to the horse.

U.S. Pat. No. 1,091,683, to Mateer, discloses an improved bridle bit. Said bit is useful for the administration of medicine and aversive training, however it is not intended for delivering rewards for the performance of a desired behavior by the horse.

Hill, U.S. Pat. No. 3,837,142, describes a horse bit assembly capable of being used to introduce liquid or other medicine into a horses's mouth through the mouth bar of same. Said bit assembly is intended for use in controlling and teaching a horse via aversive stimuli. It is not intended to be used for positive reinforcement training.

A bridle bit having a mouthpiece with independently movable cheek pieces at each end and rotatable head stall and rein ring connections fore and aft of the cheek pieces is disclosed in U.S. Pat. No. 5,062,255. Said bridle bit is useful for traditionally training or controlling a horse—it is not a positive reinforcement training aid.

U.S. Pat. No. 617,583, to Lemons, describes a combined driving and medical bit. Said bit is useful for controlling and driving a horse, and may be used to administer medicine to same.

None of the currently commercially available bridle bits enable the repeated, immediate reward to a horse for the performance of a desired behavior. The present invention overcomes this prior art shortcoming by allowing the user to practice the proven training method of positive reinforcement behavior modification specifically directed to training a horse or other bittable animal. While prior art devices are suitable for pure control via pressure and pain avoidance, they cannot be efficiently and effectively used for the repeated, immediate administration of a fluid to an animal, nor do they provide necessary behavior modification training aids to the trainer. The present invention, however, provides a bit assembly that enables the trainer to administer an immediate reward, repeatedly, without leaving the saddle. Additionally, the instant bit assembly may be used for administering medication to a sick horse or administering electrolytes to an endurance horse during a ride. Specially formulated pleasant tasting, nutritional, or medicinal fluids are intended for use in conjunction with the instant bit assembly. The invention described herein is made from any or all of the currently available substances and variations generally used with bits and bridles. The current invention, thus, provides for a novel bit assembly for controlling or training a horse without causing injury or stress to the horse. Therefore, apparatuses made according to the present invention are completely safe for their intended use.

While the prior art may allow a person to train a horse, it does not take the form of an object who's specific purpose is to modify a horse's behavior through positive reinforcement. In addition, the prior art does not disclose the repeated administration of any substance, while the instant invention is intended the repeated, at will administration of any fluid, for example, specially formulated pleasant tasting, nutritional, or medicinal fluids. Currently available commercial bits attempt only to control the horse through pain avoidance. The instant invention provides a training method and apparatus, that safely and effectively communicates via reward to the animal being trained.

An object of the present invention is to provide a bit assembly which may be employed to train young horses, break bad habits in adult horses, reinforce desired and appropriate behavior in all horses, and further train a well behaved horse at upper, more difficult levels of performance. For example, the bit assembly disclosed herein is used to prevent a horse from throwing his head, bucking, lunging, or running away. Further included herein is the provision that such a bit assembly which is employed to break-in young horses for riding, as well as teach them to back or to stop on their back feet. Also included is the provision that such a bit assembly is employed to set a horse's head in a desired position, raised or lowered, accordingly.

The present invention provides a bit assembly that may also be employed to administer medicine or other liquid into a horses's mouth through the bit assembly. Additionally, the present invention provides a bit assembly that achieves the above disclosed objectives and yet may be easily applied and used on a horse without any special skills or training of the trainer.

SUMMARY OF THE INVENTION

This invention is based on a novel concept for behavior modification training that employs a bit assembly and positive reinforcement. The invention relies on the principals of behavior modification psychology and general animal training. The present invention is defined by a device integrating a bridle and bit assembly having a means for immediate reward, said device capable of repeatedly dispensing a pleasant tasting fluid on command.

The present invention is a bit assembly that permits the inducement and/or reward of the horse during its training. The present invention is applicable to all styles of bits, bit assemblies and derivatives thereof. Furthermore, it is suitable for the training of all non-human animals capable of accepting a bit. The present invention is useful for dispensing pleasant tasting fluids, medications and electrolytes, but is not intended to be limited to these uses.

In an embodiment of the invention, the bit assembly comprises a bridle bit, flexible tubing, fluid reservoir and a fluid pumping means functionally connected, said bit having an aperture therethrough facilitating the dispensing of said fluid.

Generally, horses like sweetly flavored things, for example, molasses, which is often used in feed grain preparations. In the preferred embodiment of the invention, a water and molasses mixture is placed in a reservoir attached either to the trainer or saddle. When the trainer engages a pumping means, for example a bulb hand pump, fluid is drawn up and out of reservoir, through the pumping means, down flexible tubing into the bridle bit and through the bridle bit into the horse's mouth. Thus, at will, the trainer is able to immediately and repeatedly reward the horse. When the sweet fluid is consistently released with a specific behavior, it rewards and strengthens that behavior.

An alternative embodiment of the instant invention includes a positive reinforcement halter assembly unit employing the same concepts as disclosed herein with regard to the bit assembly. Specifically, an animal halter is fitted with an mounting means, preferably adjustable, that mounts a dispensing means such that it is functionally positionable for all animals. That is, said dispensing means is capable of adjusting to all shapes and sizes of animal heads, such that when the assembly is engaged, the fluid is dispensed into the animal's mouth. The remainder of the assembly is essentially identical to that which is disclosed herein as the instant bit assembly, including flexible connective tubing, fluid reservoir and pumping means.

The bit assembly described herein allows the trainer to instantly reward the performance of a desired behavior or movement made by the animal being trained, the trainee. Reward increases the number of occurrences of that behavior, as well as improves the performance of that behavior. The instant invention permits the animal trainer to have another means of communication with the animal being trained; rather than only the traditionally used control and pain avoidance techniques. It permits the trainer to desensitize the horse to fears by pairing a positive experience with a specific fear, greatly lowering the horse's stress level. Further, it allows the trainer to strengthen a maneuver by only rewarding the horse's best efforts, causing the horse to try harder each time in order to receive the reward.

Other features and advantages of the present invention will become apparent from the following detailed description, taken in conjunction with the accompanying figures, that illustrate by way of example, the principles of the instant invention.

BRIEF DESCRIPTION OF THE FIGURES

FIG. 3 is an exploded view of the portion indicated by the section lines 3—3 in FIG. 2 illustrating the basic check valve.

FIG. 4 is an exploded view of the portion indicated by the section lines 4—4 in FIG. 2 illustrating the spring check valve.

FIG. 5 is a perspective view of a horse and rider using the bit assembly.

Figure 1:
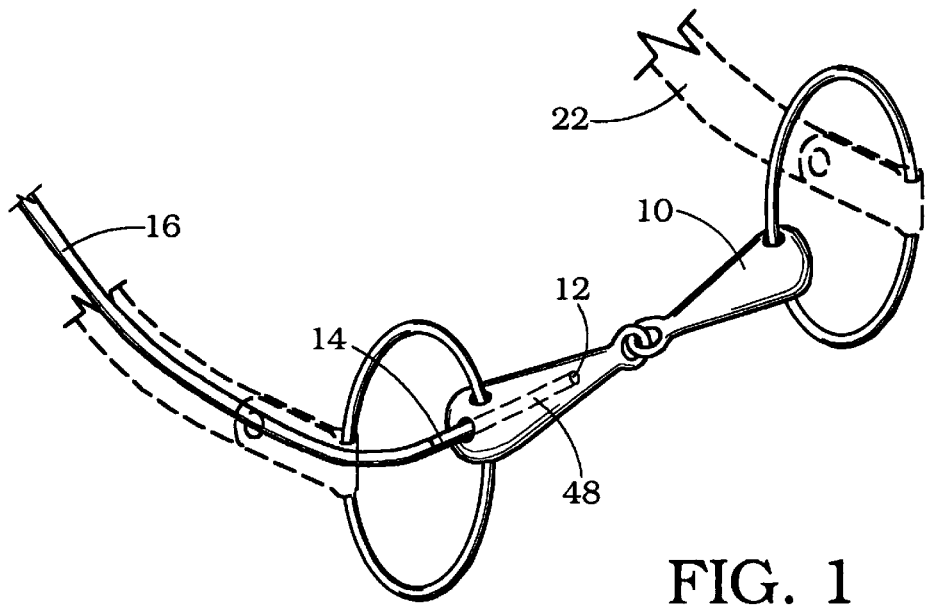
FIG. 1 is a perspective view of the bit mouth piece containing a first flow aperture and a second flow aperture. Tubing connected to the second flow aperture with bridal reins is illustrated by dotted lines.

| REFERENCE NUMERALS IN FIGURES | |
|---|---|
| 10 | hollow loose ring snaffle |
| 12 | second flow aperture |
| 14 | first flow aperture |
| 16 | tubing |
| 18 | tube connector |
| 20 | hand pump |
| 22 | bridal rein |
| 24 | spring check valve |
| 26 | basic check valve |
| 28 | reservoir |
| 30 | reservoir lid |
| 32 | seal ring |
| 34 | cylinder |
| 36 | spring |
| 38 | spring check valve body |
| 40 | basic check valve bottom |
| 42 | flat seal |

| REFERENCE NUMERALS IN FIGURES | |
|---|---|
| 44 | basic check valve top |
| 46 | connector |
| 48 | tube |

DETAILED DESCRIPTION OF THE PREFERRED EMBODIMENT

It is to be understood that both the foregoing general description and the following detailed description are exemplary and explanatory only and are not restrictive of the invention as claimed.

The present invention provides a bit assembly for the behavior modification training of, for example, horses. It is recognized by those skilled in the art that a broad range of training methodologies and alternative uses of the bit assembly may be performed in accordance with the present invention. Uses may include alternative training techniques, medication administration, dispensing of electrolytes, all animals capable of accepting a bit assembly, or any number of other uses not discussed herein. The present invention is useful for the positive reinforcement of the performance of desired behaviors in the trainee.

Figure 2:
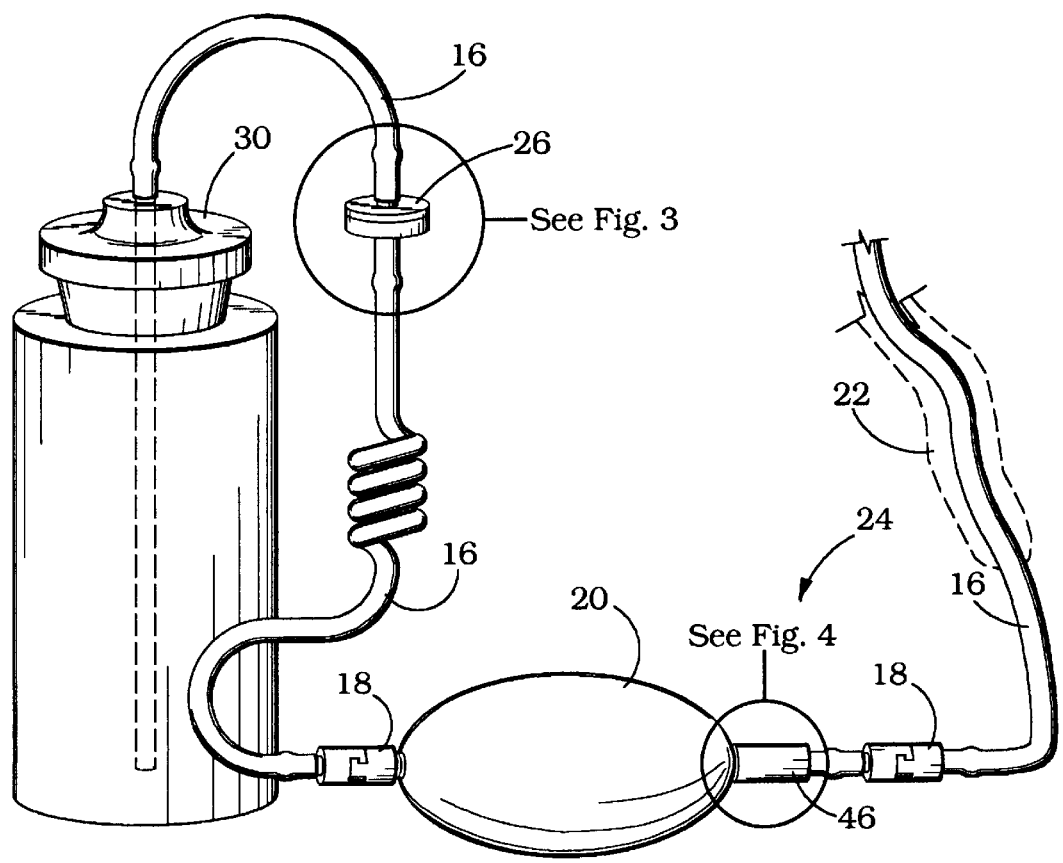
FIG. 2 is a perspective view of a fluid reservoir connected by tubing to a basic check valve, hand pump and spring check valve. The bridal rein is illustrated by dotted line.

The preferred embodiment of the device disclosed herein is defined by a bit assembly connected functionally via flexible tubing to a fluid containing reservoir, and a pumping means. As shown in FIG. 2, a reservoir 28 is shown with flexible connective tubing 16. Said reservoir 28 is made of a light weight, yet durable, material, for example, plastic. The connective tubing 16 extends from the bottom of reservoir 28 and continues up and out of reservoir lid 30 through a circular opening of an appropriate size. Proceeding, the tubing 16 continues until it connects with a basic check valve 26, fitting over the end of the basic check valve 26.

Shown in FIG. 3 is an exploded view of the basic check valve 26. In the center of the basic check valve 26 is a flat seal 42. This flat seal 42 blocks the opening such that it cannot back flow. When pressure is applied, the flat seal 42 is pushed forward allowing fluid flow therethrough. A basic check valve top 44 fits into a basic check valve bottom 40 with the flat seal 42 positioned in the middle.

Tubing 16 proceeding from the opposite end of the basic check valve 26, continues until it is joined with a hollow, cylinder tube connector 18, preferably plastic. The tube connector 18 partially inserts into the tubing 16 and adjoins a pumping means, preferably a flexible bulb hand pump, 20. Once fluid is drawn up into the hand pump 20, further squeezing or pressure pushes fluid out of the hand pump 20 and through a spring check valve 24. The spring check valve 24 is illustrated in FIG. 4 in an exploded view.

The spring check valve 24 allows fluid to be forced out. When fluid is forced into the spring check valve 24, a spring 36 located in cylinder 34 is pushed up by a spring check valve body 38. Dependant upon the specific formulation of the fluid used, a filter means may be positioned so as to prevent clogging of the spring check valve. When the spring 36 is pushed up, it creates an opening allowing fluid flow therethrough. A seal ring 32 prevents leaks or drips. When the pressure from the hand pump 20 is released, the spring 36 extends, closing the opening which prevents fluid from escaping into the tubing 16. A connector 46, preferably rubber, securely holds hand pump 20 to a plastic tube connector 18. The tube connector 18 inserts into the tubing 16. The tubing 16 proceeds, running along a bridle rein 22. The tubing 16 may be snapped onto or sewn into any bridle rein. Tubing 16 follows the bridle rein to a bridle bit, as shown in FIG. 1, for example, as a hollow, loose-ring snaffle bit 10. The tubing 16 fits over and/or attaches to a first flow aperture 14. The first flow aperture 14 is a hard, cylindrical opening extending out of one side of the hollow snaffle 10. A tube 48, preferably metal, extends inside from the first flow aperture 14 to a second flow aperture 12. After fluid has been pressured through its course, as previously described, it is forced through the tube 48, out the second flow aperture 12, where it releases into the horse's mouth.

The method and apparatus disclosed herein provides for a training and behavior modification bit assembly. Further, this device significantly reduces stresses placed on the horse in training, while improving the performance and learning potential of same.

While the above description contains many specificities, these should not be construed as limitations on the scope of the invention, but rather an exemplification of the preferred embodiment thereof. Many other variations are possible. Thus the scope of the invention should be determined by the appended claims and their legal equivalents, rather than by the example given.

We claim:

1. A bit assembly for training an animal comprising:
    a fluid reservoir with a lid having a first piece of flexible tubing extending from the floor of the reservoir through an appropriately sized aperture in said lid to a basic check valve;
    a pumping means having a first tube connector and a second tube connector, said second tube connector having a spring check valve disposed therein;
    a second piece of flexible tubing connecting said basic check valve to said first tube connector;
    a bit having a mouthpiece adapted to be received in the mouth of said animal and having laterally extending ends and ring members, said mouthpiece having an aperture therethrough and a third tube connector, said mouthpiece aperture having first and second flow apertures, said first flow aperture functionally connected to said third tube connector and entering the mouthpiece of said bit at a lateral end, said second flow aperture exiting said bit at a centralized location of said mouthpiece; and
    a third piece of flexible tubing connecting said second tube connector to said third tube connector.

2. The bit assembly as defined in claim 1 wherein said pumping means draws fluid from said reservoir, pressures said fluid through said bit assembly and into said animal's mouth.

3. The bit assembly as defined in claim 1 wherein said pumping means is a portable, hand held pumping assembly.

4. The bit assembly as defined in claim 1 wherein said bridle bit's aperture is of a shape and size such that it facilitates the accurate dispensing of a specified amount of fluid into the animal's mouth.

5. The bit assembly as defined in claim 1 wherein said assembly dispenses nutritional, non-nutritional or medicinal fluids.

6. The bit assembly as defined in claim 1 wherein said assembly dispenses specially formulated fluid.

7. The bit assembly as defined in claim 1 wherein said mouthpiece is a snaffle mouthpiece having a plurality of parts adapted to be received in the mouth of an animal and having laterally extending ends, and said ring members mounted on the outer ends of said mouthpiece.

8. The bit assembly as defined in claim 7 wherein said ring members are rotably mounted.

9. The bit assembly as defined in claim 7 wherein said ring members further comprise generally-cylindrical, elongated shanks terminating in a ring configuration.

10. The bit assembly as defined in claim 1 wherein said mouthpiece is of fixed construction adapted to be received in the mouth of an animal and having laterally extending ends, and said ring members mounted on the outer ends of said mouthpiece.

11. The bit assembly as defined in claim 10 wherein said ring members further comprise generally-cylindrical, elongated shanks terminating in a ring configuration.

* * * * *